United States Patent [19]

Scott

[11] Patent Number: 4,469,758

[45] Date of Patent: Sep. 4, 1984

[54] MAGNETIC RECORDING MATERIALS

[75] Inventor: John J. Scott, Niagara Falls, Canada

[73] Assignee: Norton Co., Worcester, Mass.

[21] Appl. No.: 481,558

[22] Filed: Apr. 4, 1983

[51] Int. Cl.³ ............................................. H01F 10/02
[52] U.S. Cl. .................................. 428/693; 428/694; 428/900
[58] Field of Search .............. 428/900, 694, 695, 693; 252/62.54; 427/127–132, 48, 212

[56] References Cited

U.S. PATENT DOCUMENTS

| 3,007,807 | 11/1961 | Radocy | 117/66 |
| 3,144,353 | 8/1964 | Hargis et al. | 117/138.8 |
| 3,630,910 | 12/1983 | Akashi et al. | 252/62.54 |
| 3,831,857 | 8/1974 | Scott | 239/424 |
| 3,865,741 | 2/1975 | Sischka | 252/62.54 |
| 4,075,384 | 2/1978 | Suzuki et al. | 428/212 |

Primary Examiner—Bernard D. Pianalto

[57] ABSTRACT

Aluminum titanate is disclosed as an additive in coatings for magnetic recording media.

4 Claims, No Drawings

MAGNETIC RECORDING MATERIALS

FIELD OF THE INVENTION

Magnetic recording tapes, discs, in particular coatings therefor, are the subject of the invention.

BACKGROUND OF THE INVENTION

A conventional ingredient in the magnetic coating on magnetic recording tapes or discs is finely particulate aluminum oxide, for the purpose of reducing mechanical wear of the tape and keeping the magnetic recording and/or reading heads of the recording or playing device clean by its abrasive action. U.S. Pat. No. 3,630,910 discloses coatings containing abrasive powders, and U.S. Pat. No. 3,007,807 discloses the use of inert powders such as diatomaceous earth (silica) to disperse the magnetic particles. Coatings containing alumina may also be used in the disc contacting surface of the holder for rotating disc type magnetic recordings.

SUMMARY OF THE INVENTION

The present invention provides a substitute for all or a portion of the aluminum oxide presently employed in coatings on magnetic recording media or their containers.

The substitute material is aluminum titanate having a typical particle size range (the same as the alumina for which it substitutes) of from 2.5 micrometers and finer and a mass average size of 0.7 or 0.8 microns. For very thin coatings the maximum size may be 1.5 microns or less. The aluminum titanate is present in the coating in the amount of from 0.1 to 6% of the weight of the other solid ingredients.

The aluminum titanate is superior to alumina in that, while being sufficiently abrasive to provide the required cleaning action and wear resistance, it is significantly softer and less harsh acting than the alumina, and has a lower coefficient of friction. In addition, when produced as taught by the present invention, the aluminum titanate has a superior, more equidimensional shape, as compared to the prior art alumina, and in conjunction with its lower coefficient of friction thus provides a lubrication function between the tape and recording or play back heads or other mechanical parts.

Manufacture of the aluminum titanate useful in the invention is accomplished by fusing a mixture of alumina and titania in a conventional electric arc furnace and rapidly quenching the material in air to form fine spherical particles that can readily be crushed and milled to less than one micrometer in size. Apparatus for rapid quenching is shown in U.S. Pat. No. 3,831,857.

The stoichiometric mixture to form 100% aluminum titanate requires 56% $Al_2O_3$ and 44% $TiO_2$, but wide variation is acceptable, from 15% titania to 60% titania being satisfactory, with the optimum believed to be at 35 to 50%. Impurities may be present such as iron oxide and silica, with lesser amounts of Mg, CaO, and $Na_2O$. Deliberate addition of 0.5 to 2% of MgO may be desireable in some cases. The fused product should generally consist of at least 50% of crystalline aluminum titanate.

A suitable conventional coating composition such as that disclosed in U.S. Pat. No. 3,630,910, containing, instead of $CrO_3$, $Al_2O_3$, SiC garnet, or $SiO_2$, can be formulated with 0.1 to 5% of aluminum titanate to give a coating composition which can be milled and coated on a suitable backing. Alternatively the aluminum titanate can be incorporated in a resin binder to be applied on top of the magnetic coating as proposed with the abrasive coatings of U.S. Pat. No. 3,630,910.

The preparation and formulation of other magnetic coatings which may be modified and improved by inclusion of aluminum titanate are disclosed in U.S. Pat. Nos. 4,075,384; 3,865,741; and 3,144,352.

The coatings may be employed on magnetic recording tapes, floppy discs, and hard discs, and may be employed in coatings in the container in which floppy discs are rotated.

What is claimed is:

1. A magnetic recording medium including a backing and a magnetic coating and having finely divided aluminum titanite included in a surface coating on the medium, said aluminum titanate being present in an amount of from 0.1 to 6% of the weight of the coating solids.

2. A recording medium as in claim 1 in which said aluminum titanate is prepared by fusion of a mixture of alumina and titania, titania being present in said mixture in an amount of from 15 to 60% based on the total weight of alumina and titania.

3. A recording medium as in claim 1 in which the aluminum titanate is contained in the magnetic coating.

4. A recording medium as in claim 1 in which the aluminum titanite is included in a surface coating over said magnetic coating.

* * * * *